United States Patent Office 3,671,188
Patented June 20, 1972

3,671,188
PROCESS FOR RECOVERING BORON IN PRODUCTS RESULTING FROM ALKALINE ATTACK ON BOROCALCIC ORES
Pierre Mathis, Dombasle-sur-Meurthe, France, assignor to Solvay & Cie, Brussels, Belgium
No Drawing. Filed Sept. 17, 1969, Ser. No. 858,852
Claims priority, application Belgium, Sept. 30, 1968, 64,114, Patent 721,615
Int. Cl. C01b 25/00
U.S. Cl. 23—59
9 Claims

ABSTRACT OF THE DISCLOSURE

Borocalcic ore is treated with an aqueous solution containing a carbonate, bicarbonate, hydroxide, or mixture thereof of at least one alkali metal compound. The resultant aqueous solution is filtered and then washed with an aqueous solution which contains at least one of the alkali metal compounds present in the treating solution. The spent washing solution is recycled and used for the treatment of additional ore.

BACKGROUND OF THE INVENTION

The present invention concerns a process for obtaining borates by the reaction of alkali or borocalcic ores.

In particular, there is a well known industrial process for preparing borax from colemanite, a borocalcic ore containing about 45% by weight of $B_2O_3$ in the form of $2CaO.3B_2O_3.5H_2O$ by means of a mixture of sodium carbonate and bicarbonate, as described in an article by F. M. Dupont's Ind. Eng. Chem., 2:500, 1910.

The reaction is as follows:

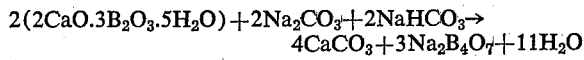

In practice the reaction is carried out at about 80° C. and a slurry is obtained which includes an aqueous phase containing $B_2O_3$, and a solid phase in suspension containing $CaCO_3$ and clay residues coming from the ore matrix.

When a previously calcined borocalcic ore undergoes alkali reaction, the solid phase can be readily separated from the solution. On the other hand, when the ore has not undergone a previous thermal treatment, it is difficult to separate the residual solid phase by filtration or even by decantation. In practice, when the slurry is treated on a rotating filter, the residual cake still contains a considerable amount of the liquid phase, representing about half of the weight of this cake. To recover the solution of $B_2O_3$ and $Na_2O$ impregnating the cake it would be necessary to carry out several successive washings with a certain amount of water. However, washing with water is not practicable because water does not pass through these cakes or does so only with great difficulty.

Similar difficulties are encountered during separation by decantation because in the course of washing with water in a countercurrent fashion, such as in a continuous washer-decanter, the rates of decantation are too low, and large areas for decantation must be provided.

To improve filtration a continuous system can be used, as is specified for the process described in French Pat. No. 1,169,045, filed on Dec. 22, 1956 by Treibacher Chemische Werke AG. According to this process a hot alkaline solution continuously percolates through a coarsely broken bed of ore. By overflowing, an aqueous solution of $B_2O_3$ and $Na_2O$ loaded with insoluble fine pieces of the ore is obtained while the large grains remain in the reactor. Alkaline reagents are added to this suspension for the purpose of improving filtration. Borax is then crystallized from the cooled filtrate, while the resulting mother liquors are returned to the reactor; the filtration cake is washed with water.

With this technique the same type of suspensions as those resulting from alkaline reactions conducted according to previous methods were obtained and as expected filterability was not improved. In addition, when the cake is washed with water it becomes clogged, and with cakes of the usual thickness, the washing water does not pass through at all. Accordingly, filtration remains a problem even in the continuous process. In previous processes, where washing with water is impossible, the residual cake actually contains up to 50% of its weight in the form of impregnated solution. Under these conditions it is necessary to recover boron impregnated in the cake.

SUMMARY OF THE INVENTION

In spite of the past difficulties, a procedure has been found wherein usual methods of reaction are used while avoiding previous problems both in separation of the slurry and of excessive losses of $B_2O_3$ and alkalis.

In particular, the object of the present invention is the provision of a simple and effective process for the recovery of dissolved $B_2O_3$ which is impregnated in the solid residues from the filtration of the mixtures which result from the reaction of alkali and borocalcic ore.

The invention concerns a process for recovering residual boron impregnated in the cake resulting from filtration of the aqueous suspension obtained by treating borocalcic ores with an aqueous solution containing one or more compounds of an alkali metal chosen from the carbonate, bicarbonate, and hydroxide of the said alkali metal. It has been discovered, unexpectedly, that by washing the filter cake with an aqueous washing solution containing at least part of the carbonate or bicarbonate of the alkali metal present in the treating solution that washing takes place rapidly and efficiently. Further, according to the invention the spent washing solution is reconstituted for use as new treating solution.

Surprisingly, it has been discovered that under these conditions, in addition to the very rapid washing that is achieved, at least 95% of the $B_2O_3$ impregnated in the filter cake is recovered.

DESCRIPTION OF THE PREFERRED EMBODIMENTS

This invention also has the advantage of considerably decreasing the total time necessary for separating the liquid and solid phases of the slurry, and furthermore, for a specific duration of operation, of considerably reducing the size of the equipment.

Filtration can be carried out in ordinary rotating filters; the filter cake thereby obtained is then washed directly while on the filter with washing solutions in accordance with the present invention.

The alkaline reagents used for reaction with borocalcic ores are well known. For example, to obtain sodium metaborate the ore is treated with $Na_2CO_3$, or in a more preferred procedure with a mixture of $Na_2CO_3+NaOH$ as disclosed in U.S. Pat. 3,218,120 which is incorporated herein by reference. When a tetraborate is desired, a mixture of sodium or ammonium carbonate and bicarbonate is used.

The washing solution containing $B_2O_3$ recovered on the cake is recycled to the reactor used for treating the borocalcic ore. Accordingly, it is advantageous for the washing solution to contain at least one of the reagents used in the treating solution. In particular, in the case of reaction with $Na_2CO_3+NaHCO_3$ it has been found that the best washing solutions, with respect to rapidity of passage through the cake, always contained $Na_2CO_3$. Likewise, the filter cake resulting from an ammoniacal reaction i.e. reaction with $NH_4HCO_3+(NH_4)_2CO_3$ is washed efficiently with a washing solution which contains $(NH_4)_2CO_3$.

Preferred constituents of washing solutions and their optimal concentration for different filter cakes were determined in the following manner:

Filterability test

The principle of the test consists of measuring the time necessary for flow through a filtration cake, of known dimensions, of a given volume of filtering liquid. Filtration occurs in an enclosure equipped with a thermostat and under excess pressure, with the filtrate being collected at the atmospheric pressure. The lower face of the cake is under atmospheric pressure, while the upper face is under a pressure of about 250 mm. Hg above that pressure, i.e. about 250 mm. Hg above the atmospheric pressure.

The equipment is constituted by a cylindrical glass tube of 40 mm. inside diameter "A" in cm.$^2$ provided in the middle with a No. 2 fritted glass plate covered with a fast paper filter. The slurry to be studied is deposited on the fast filter paper in an amount by weight "W" (in g.) of dry solid matter weighed at the end of the test, equal to 17 g. This corresponds to a filtration cake thickness of about 16 mm. The slurry also contains 100 cc. of the washing solution chosen. The chronometer is started when the equipment is put under pressure and it is stopped at time "$t$" corresponding to the moment when the liquid ceases to be level with the top of the cake. Volume "V" (in cc.) of liquid collected is then measured. Filterability "F" is equal to ratio $V \times W/A^2 t$ and is expressed in g./cm. min.

Filterability of the filter cake resulting from the treatment of colemanite with $Na_2CO_3+NaHCO_3$

| Washing solution | Filterability F in g./cm. min. |   |   |   |   |   |   |
|---|---|---|---|---|---|---|---|
| Mother liquor | 0.32 | 0.30 | 0.37 | 0.31 | 0.30 | 0.37 | 0.42 |
| $Na_2CO_3$ N sol | 0.45 |  |  | 0.59 |  | 0.48 | 0.45 |
| $Na_2CO_3+NaHCO_3$ N sol |  |  | 0.45 |  |  |  |  |
| $NaHCO_3$ N sol |  | 0.28 |  |  | 0.27 |  |  |
| Water | 0.03 | 0.03 | 0.005 | <0.05 | <0.05 | <0.05 | <0.05 |

Note.—N refers to a solution of 1 Normal strength.

It is evident that irrespective of the filterability of the cakes with respect to the passage of the mother liquor, filterability with respect to the passage of normal $Na_2CO_3$ or sodium sesquicarbonate solutions is always greater. Filterability with respect to the passage of normal $NaHCO_3$ solution is less and with respect to the passage of water is almost nil.

Another series of filtrations were carried out under the same conditions for a cake resulting from treatment with an ammonium carbonate, i.e.

$$(NH_4)_2CO_3+NH_4HCO_3$$

Filterability of filter cake resulting from the treatment of colemanite with $NH_4HCO_3 + (NH_4)_2CO_3$

| Washing solution | Filterability F in g./cm. min. |   |   |   |
|---|---|---|---|---|
| Mother liquor |  | 0.95 | 0.91 | 1.05 | 2.54 |
| $NH_4OH$ N |  | *0.92 | *0.29 |  |
| $NH_4HCO_3 \cdot (NH_4)_2CO_3$ |  |  |  | 4.18 |
| $H_2O$ |  | *0.07 |  | *0.58 |

*The cake becomes clogged.

From the above results it is apparent that the best conditions for filtration are obtained when the washing solution is constituted with $Na_2CO_3$, sodium sesquicarbonate, or an equimolecular mixture of $$NH_4HCO_3+(NH_4)_2CO_3$$

The cakes resulting from the treatment of colemanite with a sodium carbonate were washed with sodium sesquicarbonate solutions in varying concentrations improvements in filterability were obtained when solutions having concentrations as low as 0.2 N were employed. The following results were obtained.

| Washing solution | Mother liquor | Normality of sodium sesquicarbonate solution | | | | Water |
|---|---|---|---|---|---|---|
|  |  | 3 N | 2 N | N | 0.5 N |  |
| F | 0.15 | 0.18 | 0.30 | 0.23 | 0.11 | <0.05 |

Accordingly, the optimum concentration is from 0.5 N to 2 N. A concentration greater than 2 N is not advantageous. In fact, filterability of the cake diminishes and in addition, losses of alkali on the cake become too high.

The recovery of boron in accordance with the invention requires much less time and equipment than the standard operation consisting of washing with mixtures and of successive decantations. To reduce the loss of $B_2O_3$ on the residue to about one percent in using much washing water, three successive decantations each lasting about 50 minutes are required. Further the washing waters must then be reconcentrated, which necessitates a considerable consumption of steam.

The pressure required by the present process is that which is usually applied in filtration processes and no special equipment is necessary.

By washing the cake on a filter in accordance with the present invention, the final loss of $B_2O_3$ can be reduced to less than 0.5% without, however, using extensive equipment. It has been found that a weight of washing solution barely greater than that of the liquid impregnating the cake is sufficient for recovering practically all of the boron therefrom, so that a filtrate is obtained which is directly usable for reconstituting the alkaline treating medium.

In addition, it has been discovered that by washing according to the present method, the washing solution is substantially substituted for the liquid phase impregnating the solid residue of the filter cake. In fact, the initial impregnating solution containing $B_2O_3$ and $Na_2O$ is replaced with an equivalent weight of alkaline washing solution free of $B_2O_3$. However, since the concentration of this alkaline solution remains low enough, the amount of alkali finally lost on the cake does not exceed 6% of the total used for treatment (14% of the total used for treatment and washing).

The following two examples further illustrate the best mode currently contemplated for carrying out the present invention; however, these examples must not be construed as limiting the invention in any manner.

Example 1.—Three kg. of a mixture including:

594 g. of crude ground colemanite (with 45% or 268 g. of $B_2O_3$)

81 g. $(NH_4)_2CO_3$ } or 122 g. of $(NH_4)_2O$
239 g. $NH_4HCO_3$ 2048 g. of $H_2O$ are introduced into a three liter stainless steel reactor kept at 95° C.

The mixture is kept at 95° C. for six hours with moderate agitation.

The slurry obtained is filtered on a rotating filter a clear liquid with the following composition is obtained:

| | G./kg. |
|---|---|
| $B_2O_3$ | 100 |
| $Na_2O$ | 65 |
| $CO_2$ | 19 |
| $H_2O$ | 816 |

The total weight of this liquid is 2410 g. The amount of $B_2O_3$ in this clear liquid is 241 g. Accordingly, it contains 90% of the $B_2O_3$ initially present in the colemanite. Likewise, is found 65 g. × 2.410 = 157 g. of $Na_2O$, or 90% of the amount introduced. Sodium borate is then crystallized out through cooling.

At the same time, a filtration cake weighing 590 g. in all and including solid reaction residues such as $CaCO_3$ and ore matrix, both impregnated with the remainder of the clear liquid is obtained.

The cake is then washed on a filter by means of a normal sodium sesquicarbonate solution. In this case, we used 530 g. of this solution containing 16.4 g. of $Na_2O$ for washing. Filtration was readily performed without clogging and a filtrate was recovered which then contained 25.5 g. of $B_2O_3$ and 24 g. of $Na_2O$.

Lastly, the new cake remaining on the filter contained no more than 1.3 g. of $B_2O_3$ or 0.5% of the $B_2O_3$ used in the colemanite, and on the order of 4% of the total amount of $Na_2O$ used for attack and washing.

The filtrate is then recycled for attacking a new charge of colemanite.

Example 2.—A reactor identical to the preceding one is used. The following mixture is maintained at 95° C. and under pressure of 5 kg./cm.²

581 g. of colemanite (45% of $B_2O_3$ or 262 g.)
200 g. of $Na_2CO_3$
158 g. of $NaHCO_3$ } or 175 g. of $Na_2O$
2035 g. of $H_2O$ After 9 hours of reaction a slurry is obtained which is filtered. The resulting clear liquid has the following composition:

| | G./kg. |
|---|---|
| $B_2O_3$ | 99.6 |
| $(NH_4)_2O$ | 46 |
| $CO_2$ | 19 |

The total weight of this liquid is 2362 g. The amount of $B_2O_3$ in the clear liquid is 235.5 g. or 90% of the amount present in the colemanite. In addition, this clear liquid contains 109 g. of $(NH_4)_2O$. Ammonium tetraborate is crystallized out by cooling.

The cake resulting from this first filtration weighs 574 g.

As before, it is washed on a filter, but this time by means of 520 g. of a normal solution of an equimolecular mixture of $(NH_4)_2CO_3$ and $NH_4HCO_3$. This washing solution contains 13.3 g. of $(NH_4)_2O$.

Here again, washing is readily carried out and provides a filtrate containing 13.5 g. of $B_2O_3$ and 6.8 g. of $(NH_4)_2O$.

The rate of conversion of $B_2O_3$ is at least 99.5%, while at least 94% of the total amount of $(NH_4)_2O$ used for treatment is utilized (the percent of $(NH_4)_2O$ used is at least 86% when based on the amount used for treatment and washing).

Comparative example.—Such a rate of recovery of boron can only be attained in accordance with the invention and not by filtering the slurry enriched with alkaline reagents and then by washing the cake with water as has been previously proposed.

To this end, the treatment conditions described above for Example 1 were repeated.

Two parts A and B were made from the resultant slurry:

Part A was treated as is, in accordance with the invention,

Before filtration, an amount of reagents $$Na_2CO_3 + NaHCO_3$$

equal to that provided for the initial treatment was added to part B.

The two slurries were then filtered separately and measurements of the following standard filterabilities were made.

| | G./cm. min. |
|---|---|
| A | 0.42 |
| B | 0.32 |

The filter cakes obtained were then washed: part A according to the invention, and part B according to the previous technique, i.e., with water. The amount of boron recovered was then determined for each method of washing.

| Filtration cake | From Slurry A | From Slurry B |
|---|---|---|
| Washing solution | (¹) | Water |
| Cake characteristics before washing: | | |
| Wet weight in g | 28.2 | 32.0 |
| Dry weight in g | 15.3 | 17.6 |
| $B_2O_3$ content in g | 1.33 | 1.36 |
| Characteristics of the washing solution collected after 7 minutes and 30 seconds: | | |
| Volume in cm.³ | 34 | ² 5 |
| $B_2O_3$ content in g | 1.31 | 0.70 |
| Cake characteristics after washing: | | |
| $B_2O_3$ content in g | (³) | 0.64 |
| $Na_2O$ content in g | 0.32 | 0.80 |
| Recovery of $B_2O_3$ in percent by weight | 98 | 52 |

¹ N solution of Na.
² The water flows at the beginning and then the cake very rapidly becomes clogged.
³ Imperceptible traces.

The advantages of the invention are apparent. It is understood that this invention must not be limited to the special cases which have just been described. In fact, the present process also applies to the treatment of other borocalcic ores such as pandermite, ulexite, boronatrocalcite, kernite, and the like, by alkaline reagents in the form of carbonate or hydroxide or in the form of a carbonate and bicarbonate mixture. The process also applies to the washing of residues coming from filtration of slurries containing adjuvants for flocculation or filtration.

What I claim and desire to secure by Letters Patent is:

1. In a process for treating borocalcic ores with an aqueous solution containing at least one alkaline compound selected from the group consisting of the carbonate, bicarbonate and hydroxide of an alkali metal or ammonium to separate the boron values therefrom, wherein after completion of said treatment, the residue therefrom is filtered and the resultant filter cake is then washed to recover boron values impregnated thereon and wherein washing of said filter cake may cause clogging of the filter, the improvement which comprises washing said cake on said filter with an aqueous washing solution containing at least a 0.2 N concentration of an alkaline compound present in the solution used to treat said ores, said compound being selected from at least one member of the group consisting of sodium carbonate, sodium bicarbonate and an equimolar mixture of ammonium carbonate and ammonium bicarbonate and recycling the spent washing solution for treating said ore.

2. A process according to claim 1 in which the aqueous washing solution is a sodium sesquicarbonate solution.

3. A process according to claim 2 in which the aqueous washing solution has a concentration of said sodium compound at least equal to 0.2 N.

4. A process according to claim 2 in which the aqueous washing solution has a concentration of said sodium compound of about 0.5 N to 2 N.

5. A process according to claim 1 in which said filter cake is washed on said filter with an aqueous washing solution containing about a 0.2 N to 2 N concentration of said alkaline compound.

6. A process according to claim 1 in which the aqueous washing solution is a solution of an equimolecular mixture of ammonium carbonate and bicarbonate.

7. A process according to claim 6 in which the aqueous washing solution has a concentration of said mixture of ammonium compounds at least equal to 0.2 N.

8. A process according to claim 6 in which the aqueous washing solution has a concentration of said mixture of ammonium compounds of about 0.5 N to 2 N.

9. A process according to claim 1 in which the treatment of the borocalcic ore is carried out in a single treatment step.

References Cited

UNITED STATES PATENTS

| | | | |
|---|---|---|---|
| 3,018,163 | 1/1962 | May et al. | 23—59 |
| 3,069,229 | 12/1962 | Nies et al. | 23—59 |
| 3,218,120 | 11/1965 | Amodeo | 23—59 |

FOREIGN PATENTS

| | | | |
|---|---|---|---|
| 730,622 | 3/1966 | Canada | 23—59 |
| 915,191 | 1/1963 | Great Britain | 23—59 |

HERBERT T. CARTER, Primary Examiner